(12) United States Patent
Martens et al.

(10) Patent No.: US 9,412,407 B2
(45) Date of Patent: Aug. 9, 2016

(54) MULTI-STACK OPTICAL STORAGE MEDIUM

(75) Inventors: Hubert Cécile François Martens, Eindhoven (NL); Ruud Vlutters, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 692 days.

(21) Appl. No.: 10/557,686

(22) PCT Filed: May 17, 2004

(86) PCT No.: PCT/IB2004/001710
§ 371 (c)(1),
(2), (4) Date: Nov. 22, 2005

(87) PCT Pub. No.: WO2004/107329
PCT Pub. Date: Dec. 9, 2004

(65) Prior Publication Data
US 2007/0065758 A1    Mar. 22, 2007

(30) Foreign Application Priority Data

May 28, 2003  (EP) ................................. 03300020

(51) Int. Cl.
*G11B 7/24* (2013.01)
*G03C 5/00* (2006.01)
(Continued)

(52) U.S. Cl.
CPC ........ *G11B 7/24038* (2013.01); *G11B 7/00455* (2013.01); *G11B 7/24* (2013.01); *G11B 7/246* (2013.01); *G11B 7/24062* (2013.01);
(Continued)

(58) Field of Classification Search
CPC .. G03C 1/73; G11B 7/00455; G11B 7/24038; G11B 7/24065; G11B 7/24062; G11B 7/246; G11B 7/2472; G11B 7/263; G11B 7/25703; G11B 2007/0016; G11B 2220/235; G11B 2220/2562; G11B 2220/237
See application file for complete search history.

(56) References Cited

U.S. PATENT DOCUMENTS 5,134,604 A * 7/1992 Nagashima et al. ............ 369/94
5,764,619 A   6/1998 Nishiuchi et al.
(Continued)

FOREIGN PATENT DOCUMENTS

EP    1067535 A2    1/2001
EP    1067535 A9    1/2001
(Continued)

OTHER PUBLICATIONS

Machine translation of jp 2001-101709.*

*Primary Examiner* — Martin Angebranndt

(57) ABSTRACT

The invention relates to an optical storage medium comprising below an entrance face (EF) a higher recording stack ($ST_0$) comprising a higher recording layer ($L_0$) and at least a lower recording stack ($ST_1$), said lower recording stack ($ST_1$) being recorded or read back by a radiation beam (4) entering into the optical storage medium through the entrance face (EF) with a wavelength ($\lambda$), focused on said lower recording stack ($ST_1$) and transmitted through the higher recording stack ($ST_0$), a recording of the higher recording layer ($L_0$) causing an optical thickness variation between recorded and unrecorded areas of said first recording layer ($L_0$), which is included into the range $[0.03\lambda, 0.125\lambda]$.

31 Claims, 6 Drawing Sheets

(51) Int. Cl.
*G11B 7/24038* (2013.01)
*G11B 7/0045* (2006.01)
*G11B 7/24062* (2013.01)
*G11B 7/246* (2013.01)
*G11B 7/00* (2006.01)

(52) U.S. Cl.
CPC ... *G11B2007/0013* (2013.01); *G11B 2220/235* (2013.01); *G11B 2220/2562* (2013.01)

(56) References Cited

U.S. PATENT DOCUMENTS

| | | | |
|---|---|---|---|
| 5,976,658 A * | 11/1999 | Tomizawa et al. | 428/64.1 |
| 6,168,843 B1 * | 1/2001 | Kambe et al. | 428/64.1 |
| 6,226,255 B1 * | 5/2001 | Suzuki et al. | 369/275.1 |
| 6,456,584 B1 | 9/2002 | Nagata et al. | |
| 7,360,228 B2 * | 4/2008 | Van Den Oetelaar et al. | 720/718 |
| 8,473,973 B2 * | 6/2013 | Martens | 720/718 |
| 2001/0012253 A1 | 8/2001 | Ohno | |
| 2002/0025491 A1 * | 2/2002 | Morishima et al. | 430/270.19 |
| 2002/0034603 A1 * | 3/2002 | Nee | 428/64.1 |
| 2002/0051416 A1 * | 5/2002 | Suzuki | 369/59.12 |
| 2002/0067666 A1 | 6/2002 | Maeda et al. | |
| 2002/0150030 A1 | 10/2002 | Takagishi et al. | |
| 2002/0186637 A1 | 12/2002 | Van Woudenberg et al. | |
| 2003/0123379 A1 * | 7/2003 | Thompson et al. | 369/275.4 |
| 2003/0137921 A1 * | 7/2003 | Higuchi | 369/275.4 |
| 2005/0174924 A1 * | 8/2005 | Martens et al. | 369/275.4 |

FOREIGN PATENT DOCUMENTS

| | | | |
|---|---|---|---|
| EP | 1124221 | * | 6/2001 |
| EP | 1174868 | A2 | 1/2002 |
| EP | 1187119 | A2 | 3/2002 |
| EP | 1229528 | A2 | 7/2002 |
| JP | 05073955 | A | 3/1993 |
| JP | 8083426 | A | 3/1996 |
| JP | 9017025 | A | 1/1997 |
| JP | 1166622 | A | 3/1999 |
| JP | 11066622 | A | 3/1999 |
| JP | 2000311384 | A | 11/2000 |
| JP | 2001023237 | | 1/2001 |
| JP | 2001101709 | A | 4/2001 |
| JP | 2002117587 | | 4/2002 |
| TW | 509925 | B | 11/2002 |
| WO | 9631875 | A2 | 10/1996 |
| WO | 03060894 | A1 | 7/2003 |
| WO | WO03083845 | A1 | 10/2003 |
| WO | WO03107334 | A1 | 12/2003 |
| WO | WO2004021336 | A2 | 3/2004 |
| WO | WO2004042717 | A1 | 5/2004 |

* cited by examiner

MULTI-STACK OPTICAL STORAGE MEDIUM

FIELD OF THE INVENTION

The invention relates to a multi-stack optical storage medium. The invention also relates to a method of manufacturing such an optical storage medium.

The invention is particularly relevant for a dual-stack write-once optical storage medium using the DVD format.

DOMAIN OF THE INVENTION

Recently the Digital Versatile Disk (DVD) has gained market share as a medium with much higher data storage capacity than the CD. Presently, this format is available in a read-only (ROM), a recordable or a write-once (R) and a rewritable (RW) version.

A write-once or rewritable optical storage medium like a DVD comprises a recording stack comprising a recording layer. Recording of information in the optical storage medium occurs by locally modifying the optical properties of the recording layer with an intense laser beam. The recorded parts are usually referred to as pits or marks. An issue for both the write-once and the rewritable DVD format is the limited capacity and resulting recording time, because only single-stacked media are present with a maximum capacity of 4.7 GB.

A DVD-video, which is a ROM disk, dual-stack medium with 8.5 GB capacity, often referred to as DVD-9, already has a considerable market share, but information cannot be written on such DVDs.

Consequently, write-once DVDs with at least two stacks, which provide a capacity around 8.5 GB, are highly desired.

A problem raised by a dual-stack write-once optical storage medium is that the recording of data inevitably introduces local variations in the optical properties of the recording stacks. When accessing a recording stack through a written higher recording stack, the local variations in optical properties of the higher recording stack may deteriorate the focused optical beam used for reading and writing of the lower recording stack. If the aberrations introduced by the higher recording stack are too severe, writing and/or reading of the lower stacks may become impossible or of unacceptable quality.

Among the conditions which must be fulfilled by the stacks of the optical storage medium in order to limit the aberrations introduced by a higher recording stack to an acceptable level, is a reduction of the phase difference of the light transmitted through written and unwritten parts of the higher recording stack.

FIGS. 1a and 1b show an optical storage medium comprising a higher recording stack $UST_0$, $RST_0$ and a lower recording stack $ST_1$. The recording layer of the lower recording stack $ST_1$ is being recorded or read back by a laser beam 4, which is focused on said lower recording stack $ST_1$. Said laser beam 4 has a wave front 5, 7 and a focal spot 6, 8. In FIG. 1a, in which the higher recording stack $UST_0$ is unrecorded, the focused laser beam 4 does not present any aberration of its wave front 5 or focal spot 6. In FIG. 1b, in which the higher recording stack $RST_0$ contains recorded data, the focused laser beam 4 shows some aberrations in its wave front 7 and in its focal spot 8.

A write-once DVD (DVD-R) with two recording stacks is disclosed in the Japanese patent application published on the 13th of Apr. 2001 with the publication number 2001-101709. Said recording stacks have a so-called MIM structure, which comprises a top thin metal recording layer M, an interference layer I, and another thin metal layer M. The solution proposed ensures that, using a focused laser beam with a wavelength $\lambda$, the phase difference of the light transmitted through written and unwritten parts of the higher recording stack is always less than 10 degrees or equivalently less than 0.02 times $\lambda$, which is obtained by making a recording layer sufficiently thin. For example, using a wavelength of 655 nm, the optical thickness of the first recording layer, which is equal to the product of the refractive index and the thickness of the first recording layer, must be less than 13 nm.

The main drawback of this solution is that the manufacture of such a thin metal recording layer is quite difficult.

SUMMARY OF THE INVENTION

The object of the invention is to provide a solution for implementing an optical storage medium with at least two recording stacks which is easier to manufacture.

This is achieved with an optical storage medium comprising on an entrance face a higher recording stack having a thickness $d_R$ and a refractive index $n_R$ and at least a lower recording stack, said lower recording stack being recorded or read back by a radiation beam entering the optical storage medium through the entrance face with a wavelength $\lambda$, focused on said lower recording stack, and transmitted through the higher recording stack, a recording of the higher recording layer causing an optical thickness variation $\Delta(n_R \cdot d_R)$ between recorded and unrecorded areas of said first recording layer which lies within the range $[0.03\lambda, 0.125\lambda]$.

According to the invention, an optical storage medium is provided which ensures that, using a focused radiation beam with a wavelength $\lambda$, data recording of the higher recording layer will not modify optical properties of the radiation beam to such an extent that recording or reading back of a lower recording stack will be deteriorated. In particular, the optical storage medium in accordance with the invention ensures that the radiation beam is transmitted through a zone of the higher recording layer comprising recorded and unrecorded areas with a local wave front phase variation $\Delta\Phi$ which always remains within the range of $[0.03\lambda, 0.125\lambda]$. The higher recording layer has a thickness $d_R$ and a refractive index $n_R$. In the optical storage medium in accordance with the invention, a recording of the higher recording layer causes a change of optical thickness, which is a product of said thickness $d_R$ and said refractive index $n_R$ of the higher recording layer. The local wave front phase variation $\Delta\Phi$ can be estimated by realizing that it is mainly the change in optical thickness $\Delta(n_R \cdot d_R)$ of the higher recording layer that results in a phase difference in transmission. Thus, the following equation $EQ_1$ is obtained:

$$\Delta\Phi = \Delta(n_R \cdot d_R) \approx \Delta n_R \cdot d_R + n_R \cdot \Delta d_R \quad (EQ_1)$$

The higher recording layer comprises a recording material which is, for example, an organic dye material. It should be noted that for organic dye materials, data recording is mainly induced by a change (decrease) of the refractive index $\Delta n_R$. Therefore, equation $EQ_1$ reduces to equation $EQ_{1B}$:

$$\Delta\Phi = \Delta n_R \cdot d_R \quad (EQ_{1B})$$

In both cases, the condition imposed on $\Delta\Phi$ is fulfilled by choosing an appropriate thickness $d_R$ of the higher recording layer.

If we consider a focused radiation beam having a wavelength $\lambda$ being transmitted through a higher recording layer containing recorded data, the upper limit on $\Delta\Phi$ of $0.125\lambda$ can be derived as follows. The Maréchal criterion states that a focal spot remains "diffraction limited" if the root-meansquare (RMS) wave front error $We_{RMS}=\sqrt{|\langle W \rangle^2 - \langle W^2 \rangle|}$ that is introduced by the local wave front phase variations $\Delta\Phi$ is less than $0.072\lambda$. In a recorded area, a fraction x of the recording layer contains marks; typically $\frac{1}{6} \leq x \leq \frac{1}{4}$. When a wave front is transmitted through a recording layer containing recorded data, each recorded mark introduces a phase shift $\Delta\Phi$ to the part of the wave front that is incident on the mark. When averaged over the total wave front, the RMS wave front error becomes $We_{RMS}=\Delta\Phi\cdot\sqrt{(x-x^2)}$. A conservative estimate of the maximum allowed $\Delta\Phi$ is obtained by taking $x=\frac{1}{4}$ and this results in $\Delta\Phi \leq 0.072\lambda/\sqrt{(3/16)}$, i.e. $\Delta\Phi \leq 0.125\lambda$. The lower limit for $\Delta\Phi$ is determined by considerations on modulation. Modulation stands for the maximum amplitude of the signals coming from the disc. Modulation of the signal is defined as the difference between the highest signal level and the lowest signal level, normalized by the highest signal level coming from the disk. For a recording material like an organic dye material, in which the refractive index is changed by a recording process, it turns out that when $\Delta\Phi$ is less than $0.03\lambda$, the modulation becomes too weak for allowing a reliable read-back of the recorded disk.

It should be noted that the optical thickness $\Delta(n_R\cdot d_R)$ of the higher recording layer is preferably chosen in the range of values $[0.05\lambda, 0.09\lambda]$, most preferably chosen in the range of values $[0.06\lambda, 0.08\lambda]$, for example equal to $0.073\lambda$, because these values give the best compromise between modulation of the signal and local wave front phase variation.

A consequence of the above-mentioned condition for the local wave front phase change is that the higher recording layer of the optical storage medium in accordance with the invention does not need to be as thin as the one used in the MIM structure in accordance with the prior art. Said higher recording layer is thus easier to manufacture. Using, for example, an organic dye material having a refractive index of 2.2 in unrecorded areas and of 1.6 in recorded areas of the higher recording layer, an optical storage medium in accordance with the invention using the DVD format, that is with a radiation beam having a wavelength of approximately 655 nm, must have a higher recording layer thickness $d_R$ in the range $28\ nm \leq d_R \leq 115\ nm$.

In a first embodiment of the invention, said higher recording layer ($L_0$) is made of an organic dye material. An advantage of the use of a higher recording layer made of an organic dye over a higher recording layer made of thin metal is that organic dyes require lower temperatures (200-300° C.) than thin metal films (at least 300-400° C.) to achieve recording. Moreover, organic dyes have a very low heat conductivity, that is they lose their heat at a comparatively low rate, whereas metals have high heat conductivity and thus lose heat at a higher rate. The higher recording stack structure according to the first embodiment of the invention therefore requires a lower recording power than does the MIM stack structure. For example, at 1× speed, that is the standard speed of 3.49 m/s for DVDs, organic dye materials typically require less than 10 mW, whereas the MIM structure requires 12 mW. Said higher recording layer is therefore less power consuming, which is advantageous for portable applications.

In a second embodiment of the invention, the higher recording stack ($ST_0$) comprises a thin metal reflector layer ($M_0$). Compared with the MIM structure of the higher recording stack used in the prior art, only one thin metal layer is used in the optical storage medium in accordance with the second embodiment of the invention, which allows a higher transmission of the laser light, that is a greater fraction of light that can go through the higher recording stack and reach the lower recording stack.

In another embodiment of the invention, said thin metal layer is made of an Ag alloy, whereas the MIM structure comprises almost pure Au. The higher recording stack structure used by the optical storage medium in accordance with the invention is therefore cheaper.

BRIEF DESCRIPTION OF THE DRAWINGS

The invention will be further described with reference to the accompanying drawings.

DETAILED DESCRIPTION OF THE INVENTION

Figure 1A:
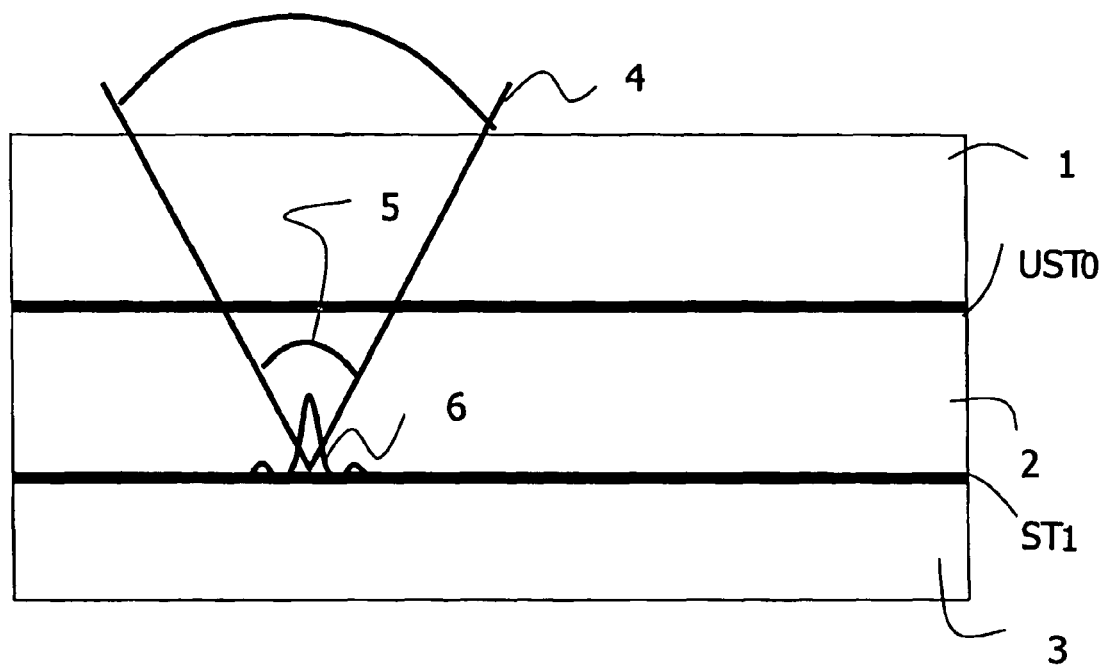
FIG. 1a shows a laser beam focused on the lower recording layer and passing through the unrecorded higher recording layer of an optical storage medium.
Figure 1B:
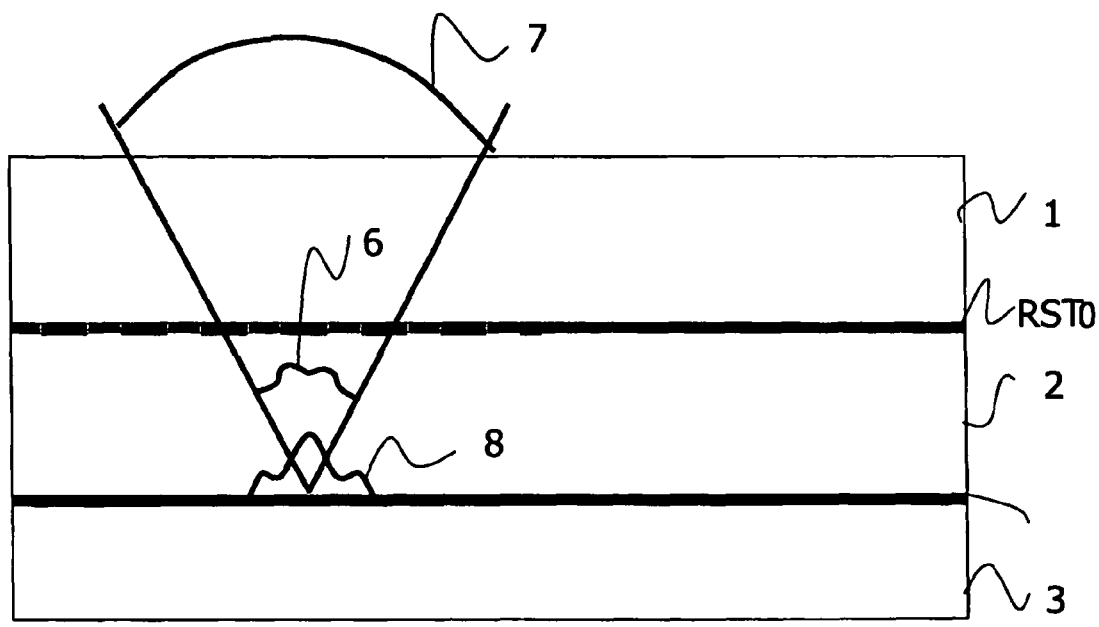
FIG. 1b shows a wave front aberration produced by a laser beam focused on the lower recording layer when passing through the higher recording layer of an optical storage medium, said higher recording layer comprising recorded data.
Figure 2:
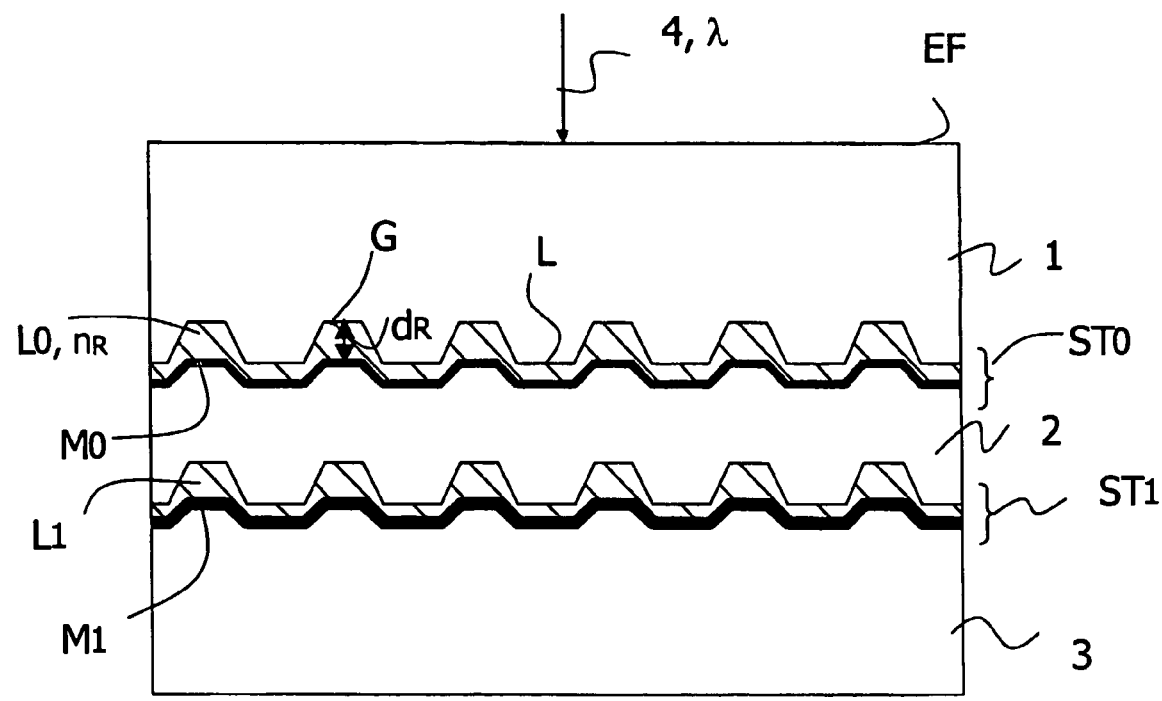
FIG. 2 shows a schematic layout of a dual-stack optical storage medium according to the invention.

An optical storage medium in accordance with the invention is shown in FIG. 2. Said optical storage medium comprises below an entrance face EF a substrate 1, a higher recording stack $ST_0$, a spacer layer 2, a lower recording stack $ST_1$, and a second substrate 3. The higher recording stack $ST_0$ comprises a higher recording layer $L_0$ and a thin metal reflector layer $M_0$. The lower recording stack $ST_1$ comprises a lower recording layer $L_1$ and a thick metal reflector layer $M_1$.

In a first embodiment of the invention, the higher recording layer $L_0$ is made, for example, of organic dye having a refractive index $n_R$ and a variation $\Delta n_R$ of refractive index between unrecorded and recorded parts of the layer $L_0$. This is not limitative, however, because the higher recording layer $L_0$ may equally well be made of any recording material in which the recording process is based on a change in its refractive index.

It should be noted as well that, although in this embodiment of the invention the recording stack only comprises one recording layer $L_0$ and one thin metal layer $M_0$, the invention also applies to more complicated recording stacks.

Said organic dye material enables write-once data recording, as it is deteriorated by the recording process in such a way that data recording cannot be repeated. Consequently the first embodiment of the invention relates to a write-once optical storage medium. It should be noted, however, that the invention also concerns a rewritable optical storage medium, wherein the higher recording layer is made of a rewritable material, such that data recording causes a change in optical thickness of said rewritable material.

Figure 3A:
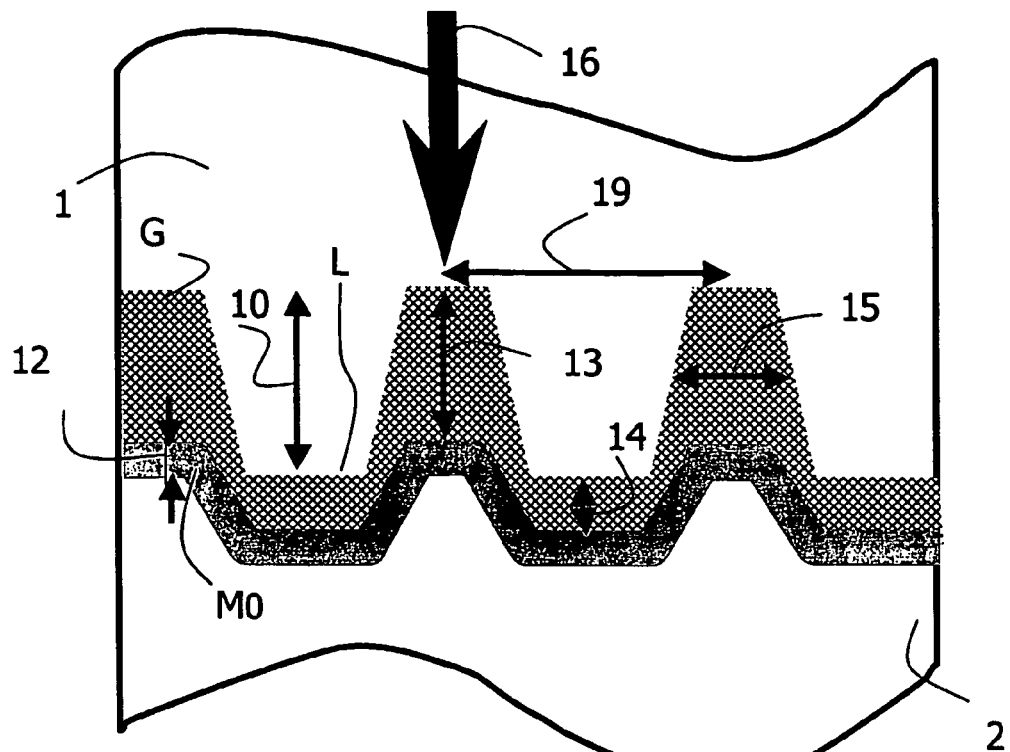
FIG. 3a shows a detailed structure of the higher recording stack.

FIG. 3a shows the structure of the higher recording stack $ST_0$ in accordance with the first embodiment of the invention.

The organic dye material is, for example AZO or cyanine dye. The higher recording layer $L_0$ is applied to the transparent pre-grooved substrate 1. The substrate 1 has a thickness value preferably lying within the range [0.30 mm, 1.2 mm], for example equal to 0.575 mm. It should be noted that a smaller range of authorized thickness values of [0.56 mm, 0.60 mm] is preferably used for DVDs.

The higher recording layer $L_0$ comprises grooves G and lands L. A groove G has, for example, a depth 10 of 160 nm and a width 15 of 320 nm. The distance between two grooves, also called track pitch 19, preferably equals 740 nm. The higher recording layer $L_0$ usually comprises at least two different values of its thickness $d_R$, which are a thickness on groove 13 of, for example, 60, 80, or 100 nm (upper limit is 115 nm), and a thickness on land 14 of 15, 25, or 40 nm. The thin metal layer $M_0$ has a thickness value 12 preferably in the range of [5 nm, 25 nm] and, for example, equal to 12 nm. An arrow 6 indicates the direction and position of the focused laser beam used for recording and reading the optical storage medium. For recordable DVDs, the focused laser beam has a wavelength $\lambda$ approximately equal to 655 nm and a numerical aperture NA equal to 0.65. The transparent spacer layer 2 has a depth value substantially greater than the depth of focus of the focused radiation beam, which preferably lies within a range of [0.03 mm, 0.07 mm] and more preferably is equal to 0.05 mm.

An optical disc in accordance with the first embodiment of the invention may be manufactured as follows: the polycarbonate substrate 1 is molded by a stamper, which creates grooves G in the substrate 1. The organic dye material intended to form the higher recording layer $L_0$ is applied, for example, by means of spin-coating onto the pre-grooved substrate 1. Next, a semitransparent mirror made of silver alloy, called thin metal reflector layer $M_0$, is applied, for example by sputtering. On top of the thin metal layer $M_0$, a spacer layer 2 is fabricated by applying a UV-curable lacquer. The grooves G of the substrate 1 are replicated in the lacquer by pressing a stamper (for example of Zeonor). The lacquer is subsequently exposed to UV in order to cure it. On top of the grooves of the spacer layer 2, a new dye-based recording layer $L_1$ is applied. Next, a thick metal reflector layer $M_1$ is applied. The optical disc is finalized by gluing a dummy substrate 3 to the back of the thick metal layer.

An advantage of the use of a higher recording layer made of organic dye is that the organic dye can be applied by spin-coating, whereas the MIM structure requires additional sputter deposition steps for the interference layer and the thin metal recording layer. Spin-coating is easier to implement than sputtering. The fabrication procedure for the optical storage medium in accordance with the invention is therefore cheaper.

It is to be noted that the above-mentioned manufacturing method relates to dual-stack optical media, but that those skilled in the art should be able to derive a similar method for multi-stack optical media.

Figure 3B:
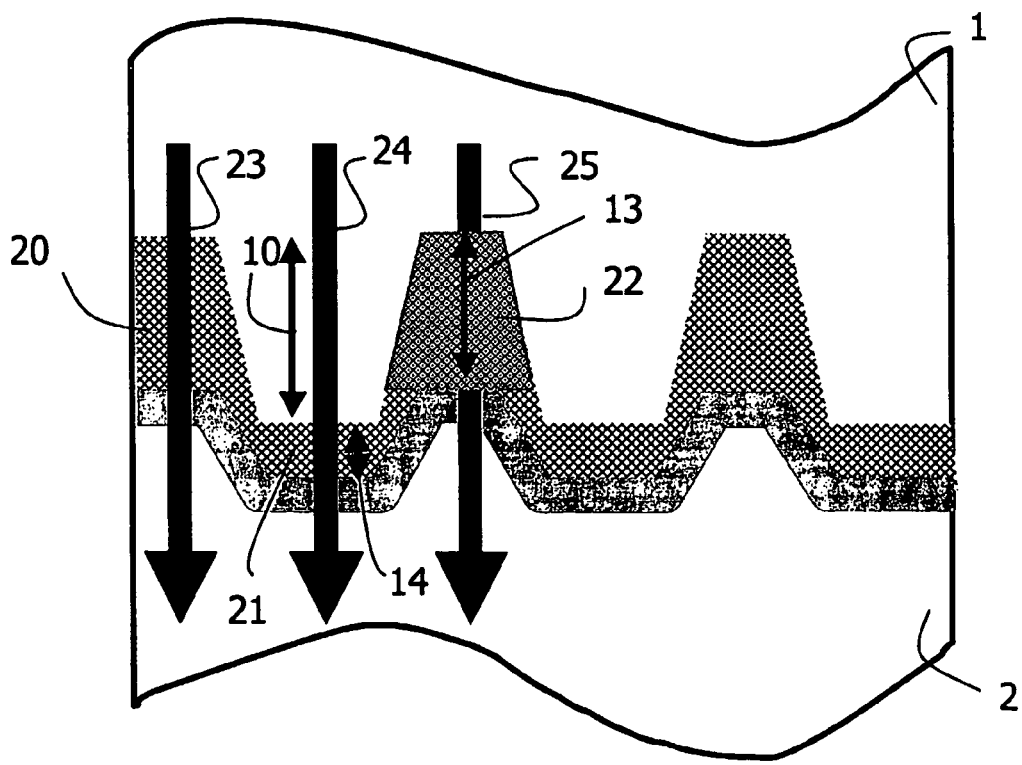
FIG. 3b illustrates differences in optical path for light transmitted through an empty groove, an empty land, or a recorded groove of the higher recording layer.

FIG. 3b shows the differences in optical path length transmitted through an empty groove 20, a land 21, and a recorded groove 22. In the case of a dye-based recording stack $ST_0$, the fact that the first recording layer $L_0$ comprises grooves and lands, also called leveling, introduces three different phases in transmission, which are a phase of land $\Phi_L$ of the focused optical beam 24 when passing trough a land 21, a phase of empty groove $\Phi_{GE}$ of the focused optical beam 23 when passing trough an empty groove 20, and a phase of recorded groove $\Phi_{GR}$ of the focused optical beam 25 when passing trough a recorded groove 25. The obtained phase differences are the following:

$\Phi_{GE} - \Phi_{GR} = \Delta n_R \cdot d_G$ (EQ$_2$), where $d_G$ is the groove depth 13 and $\Delta n_R$ the variation of the refractive index $n_R$ of the dye-based recording layer.

$\Phi_{GE} - \Phi_L = (n_R - n_0) \cdot (d_G - d_L)$ (EQ$_3$), where $n_0$ is the refractive index of the substrate 1 and $d_L$ the land depth 14, $\Phi_L - \Phi_{GR} = \Delta n_R \cdot d_G - (n_R - n_0) \cdot (d_G - d_L)$ (EQ$_4$).

Equation EQ$_2$ is equivalent to equation EQ$_1$. Another point is that a phase difference smaller than $0.125 \cdot \lambda$ is required for these three equations. However, with dye-based recording materials, $\Delta n_R \approx n_R - n_0$. Consequently, it turns out that the largest phase difference is given by equations EQ$_1$ and EQ$_2$, which means that only EQ$_1$ needs to be considered in the design of the first recording layer $L_0$.

Figure 4A:
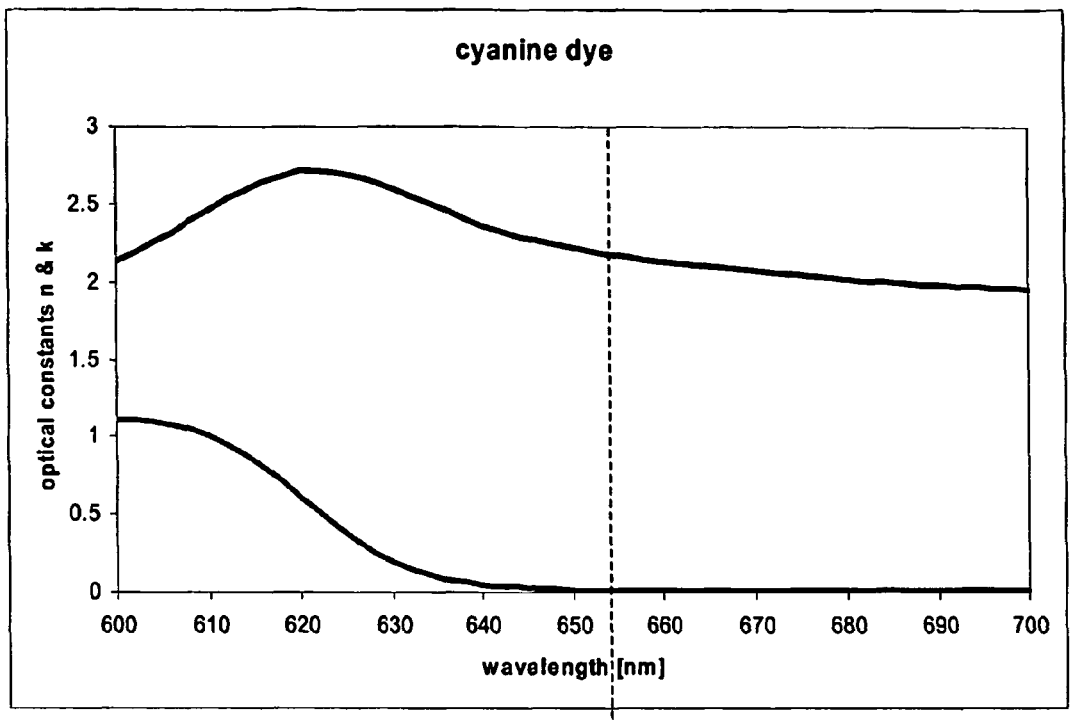
FIGS. 4a and 4b show the optical constants of AZO and cyanine organic dye materials as functions of the wavelength.
Figure 4B:
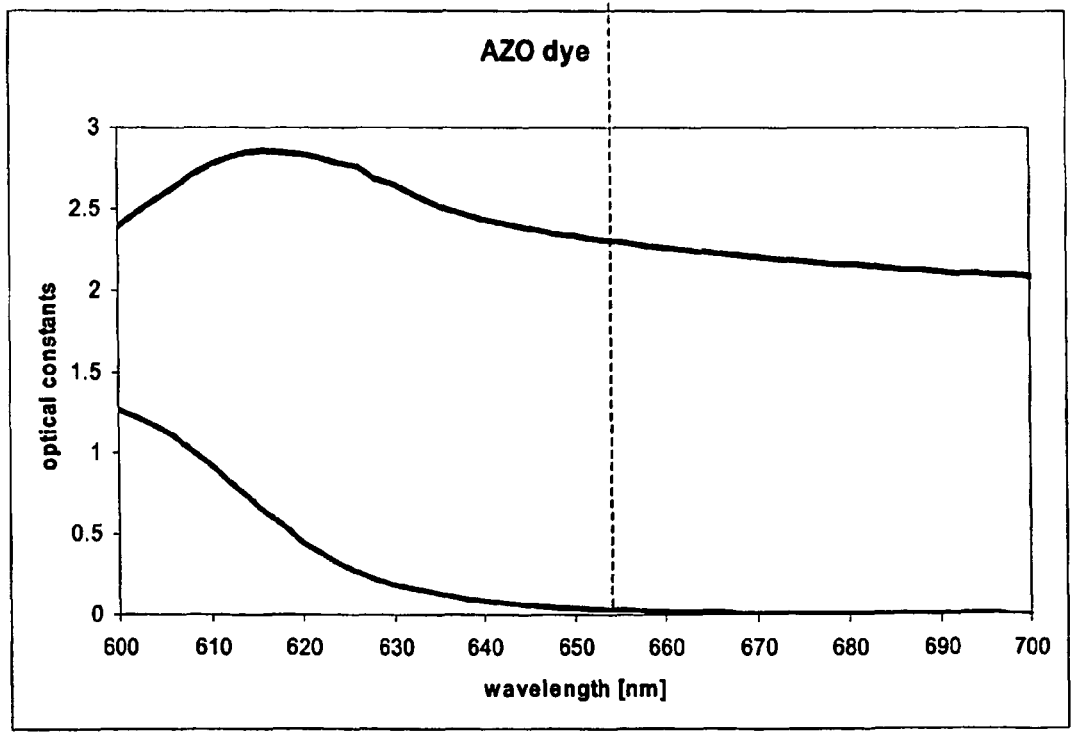

FIGS. 4a and 4b show the optical constants of two types of organic dye materials as functions of the wavelength $\lambda$. The optical constant of a material is the complex refractive index $\tilde{n} = n + i \cdot k$. In the first embodiment of the invention, the wavelength $\lambda$ equals 655 nm and either an AZO dye material with a real part $n_{R1}$ of the refractive index approximately equal to 2.3 or a cyanine dye material with a real part $n_{R2}$ of the refractive index equal to 2.2 is used. When data are recorded into the recording layer, the refractive index falls to approximately 1.6.

Figure 5:
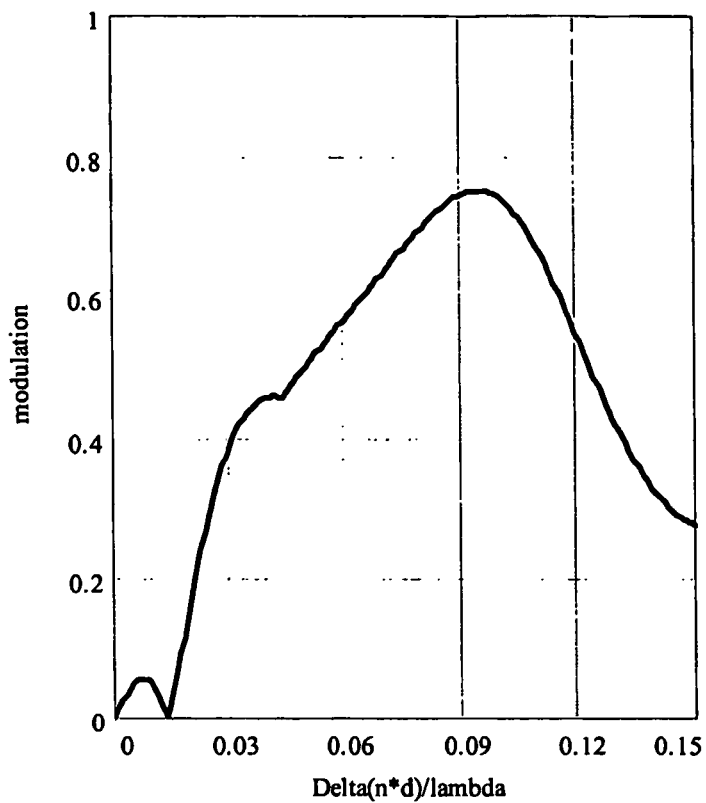
FIG. 5 shows the modulation as a function of the product of the refractive index variation and the thickness of the higher recording layer.

FIG. 5 shows the modulation as a function of the product of the refractive index variation and the thickness of the first recording layer. For DVDs, the modulation is expected to remain greater than 0.6. For other applications, values lower than 0.6 may be acceptable.

It turns out that choosing a first recording layer $L_0$ with a thickness $\Delta n_R \cdot d_R$ greater than $0.06 \cdot \lambda$ guarantees a modulation value above 0.6.

Figure 6:
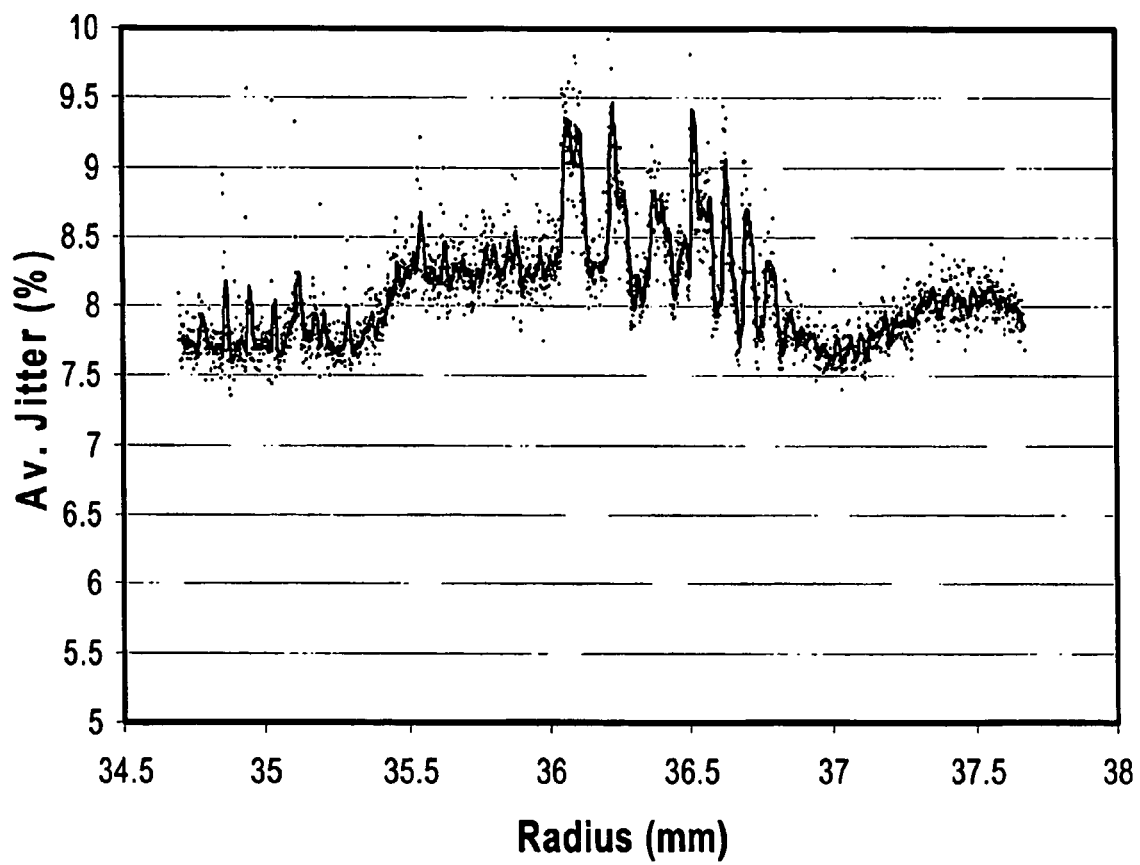
FIG. 6 shows a diagram indicating jitter measurements of data read back from the lower recording layer through the partially recorded higher recording layer.

FIG. 6 shows a diagram indicating jitter measurements of data read back from the second recording layer $L_1$ through the partially recorded recording layer $L_0$. Gray bands indicate the radii of the optical disk for which data have been recorded on the first recording layer $L_0$.

In optical disks, data are encoded in the lengths of pits and of the unrecorded areas that are in between the pits, also called spaces, that are recorded on the disk. It should be noted that the actual recording of marks does not necessarily take place in the groove G but may take place in the area L between grooves, also referred to as lands. On this case the guide groove G merely serves as a servo tracking means with the actual radiation beam recording spot being present on the land.

A length should be an integer multiple of a predefined channel bit length. For example, the predefined channel bit length equals 146.7 nm for a dual-layer density DVD. Since it is not possible to record such a length precisely, an evaluation of the error made in the recording of the lengths is highly needed.

A possible measurement of such an error is provided by the jitter. The jitter is defined as the width of the distribution of the leading and trailing edges of the pits and spaces with respect to the expected or ideal positions of these edges, which is given by the predefined channel bit length. What is actually measured in the experiments is the distribution in timing errors of the leading and trailing edges of the signals coming from the disk during read-out with respect to the expected timing. Said timing is given by the ratio of the bit length and the read velocity. The average jitter curve 30 shows that the recording of the first recording layer $L_0$ of an optical storage medium according to the invention only causes a small increase of the jitter values, which corresponds to only small deteriorations of the conditions for reading the second recording layer $L_1$.

It should be noted that the above-mentioned embodiments illustrate rather than limit the invention, and that those skilled in the art will be able to design many alternative embodiments without departing from the scope of the appended claims. In the claims, any reference signs places between parentheses shall not be construed as limiting the claims. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

The invention claimed is:

1. A multi-stack optical storage medium in a disk format with at least one stack receiving a radiation beam through another stack, comprising:
   a semi-transparent first substrate, with an entrance face and pre-grooved face on the opposite side from the entrance face, and a thickness within a range of 0.56 mm and 0.60 mm;
   a higher stack and a lower stack, separated by a spacer having a thickness within a range of 0.03 mm and 0.07 mm extending between the pre-grooved face of the semi-transparent first substrate and a second substrate, and including respective recording layers, the recording layer of the higher stack having a thickness on groove and a variation of thickness on groove between recorded and unrecorded areas equal to a first range of $0.06\lambda$ to $0.08\lambda$; and
   the entrance face is configured for receiving the radiation beam having a wavelength ($\lambda$) less than or approximately equal to 655 nm and a wave front phase variation of within the first range for recording data on the recording layers, wherein data is recorded on the recording layer of the higher stack by the beam passing through the entrance face alone and on the recording layer of the lower stack by the beam passing through the entrance face and through the recording layer of the higher stack,
   wherein the recording layer of the higher stack comprises an organic dye material having: the thickness on groove greater than 28 nm and less than 115 nm.

2. The optical storage medium of claim 1, wherein the radiation beam comprises a wavelength approximately equal to 655 nm.

3. The optical storage medium of claim 2, wherein the optical storage medium has the DVD format.

4. The optical storage medium of claim 1, wherein the thickness of a first metal reflector layer in of the higher stack is greater than 5 nm and less than 25 nm.

5. The optical storage medium of claim 1, wherein the recording layer of the higher stack comprises grooves and lands with the grooves having a width of 320 nm, a distance between grooves of 740 nm and wherein the thickness of the recording layer of the higher stack on the grooves is larger than the thickness on the lands.

6. The optical storage medium of claim 5, wherein the thickness of the recording layer of the higher stack on the grooves is one of 60 nm, 80 nm, 100 nm or 115 nm.

7. The optical storage medium of claim 5, wherein the thickness of the recording layer of the higher stack on the lands is one of 25 nm or 40 nm.

8. The optical storage medium of claim 1, wherein the variation of thickness periodically varies at defined intervals of the recording layer of the higher stack.

9. The optical storage medium of claim 1, wherein the variation of the thickness on groove of the recording layer of the higher stack is $0.073\lambda$.

10. The optical storage medium of claim 1, wherein the higher stack further comprises a first metal reflector layer and the lower stack further comprises a second metal reflector layer and the first metal reflector layer is sufficiently thinner than the second metal reflector layer to reduce the wave front phase variation through the first metal reflector layer.

11. The optical storage medium of claim 1, wherein the wavelength ($\lambda$) is approximately equal to 655 nm, and the dye material is at least one of the group of: an AZO dye material with a real part of the refractive index approximately equal to 2.3; and a cyanine dye material with a real part of the refractive index equal to 2.2; and when data are recorded into the recording layer, the refractive index falls to approximately 1.6.

12. The optical storage medium of claim 1, wherein the higher recording stack further comprises a thin metal reflector layer of silver in the range of 5 nm to 25 nm thick.

13. The optical storage medium of claim 1, wherein the lower recording stack comprises a thick metal reflector layer that is thicker in relation to a thin metal reflector layer of the higher stack.

14. The optical storage medium of claim 1, wherein the spacer is a transparent layer of UV curable lacquer deposited by spin coating, in which grooves are formed by stamping and having a thickness of 0.05 mm.

15. The optical storage medium of claim 1, wherein the second substrate is glued to the lower surface of the lower stack.

16. A method of manufacturing a multi-stack optical storage medium in a disk format with at least one stack receiving a radiation beam through another stack, the method comprising acts of:
   providing a semi-transparent first substrate having a thickness within a range of 0.56 mm and 0.60 mm, an entrance face and a pre-grooved face on the opposite bottom side of the semi-transparent substrate from the entrance face, the entrance face is configured to receive a radiation beam having a wavelength ($\lambda$) less than or approximately equal to 655 nm;
   forming a higher recording layer having a thickness on groove greater than 28 nm and less than 115 nm and a variation of the thickness on groove between recorded and unrecorded areas within a first range by depositing an organic dye onto the pre-grooved face of the semi-transparent substrate by spin-coating, wherein the first range is $0.06\lambda$ to $0.08\lambda$;
   applying a first metal reflector layer under the higher recording layer by sputtering;
   applying a spacer layer under the first metal reflector layer by applying a UV-curable lacquer to the first metal reflector layer by spin coating, the spacer layer having a thickness within a range of 0.03 mm and 0.07 mm;
   forming grooves in the UV-curable lacquer of the spacer layer, by pressing a stamper into the UV-curable lacquer, to replicate the grooves in the semi-transparent substrate;
   curing the UV-curable lacquer by exposing the UV-curable lacquer to UV;
   depositing a lower recording layer by depositing an organic dye onto the grooves of the spacer layer by spin-coating;
   applying a second metal reflector layer below the lower recording layer by sputtering, the second metal reflector layer is sufficiently thicker than the first metal reflector layer to reduce the wave front phase variation when a radiation beam traveling through the first metal reflector layer records data on the lower recording layer at the second metal reflector layer; and applying a second substrate to the second metal reflector layer, wherein the data is recorded on the higher recording layer through the entrance face alone and on the lower recording layer through the entrance face and through the higher recording layer without causing deterioration in optical properties of the radiation beam and the recorded areas on the lower recording layer.

17. A multi-stack optical storage medium in a disk format with at least one stack receiving a radiation beam through another stack, comprising:

a semi-transparent first substrate having a thickness within a range of 0.56 mm and 0.60 mm, an entrance face and a pre-grooved face on the opposite bottom side of the semi-transparent first substrate from the entrance face the entrance face is configured to receive a radiation beam having a wavelength (λ) less than or approximately equal to 655 nm ;

a higher recording layer of organic dye below the semi-transparent first substrate, the organic dye coating the grooves and having a thickness on groove greater than 28 nm and less than 115 nm and a variation of the thickness on groove between recorded and unrecorded areas within a first range of 0.06 λ to 0.08 λ;

a first metal reflector layer below the higher recording layer;

a spacer layer below the first metal reflector layer and having grooves on a bottom surface that replicate the grooves in the pre-grooved face of the semi-transparent first substrate, the spacer layer having a thickness within a range of 0.03 mm and 0.07 mm;

a lower recording layer of organic dye below the spacer layer, the organic dye coating the grooves;

a second metal reflector layer below the lower recording layer, the second metal reflector layer is sufficiently thicker than first metal reflector layer to reduce the wave front phase variation when a radiation beam traveling through the first metal reflector layer writes data on the second recording layer at the second metal reflector layer; and a second substrate to the second metal reflector layer, wherein the entrance face enables recording of data on the higher recording layer through the entrance face alone and on the lower recording layer through the entrance face and through the higher recording layer without causing deterioration in optical properties of the radiation beam and the recording areas on the lower recording layer.

18. The optical storage medium of claim 17, wherein the thickness of the semi-transparent first substrate is approximately 0.575 mm.

19. The optical storage medium of claim 17, wherein the wavelength (λ) is approximately equal to 655 nm, and the dye material is at least one of the group of: an AZO dye material with a real part of the refractive index approximately equal to 2.3; and a cyanine dye material with a real part of the refractive index equal to 2.2; and when data are recorded into the recording layer, the refractive index falls to approximately 1.6.

20. The optical storage medium of claim 17, wherein the first metal reflector layer comprises a thin metal reflector layer of silver in the range of 5 nm to 25 nm thick.

21. The optical storage medium of claim 17, wherein the UV curable lacquer is a spacer layer having a thickness of 0.05 mm.

22. The optical storage medium of claim 17, wherein the second substrate is glued to the lower surface of the lower stack.

23. The optical storage medium of claim 17, wherein the radiation beam comprises a wavelength approximately equal to 655 nm.

24. The optical storage medium of claim 17, wherein the optical storage medium has the DVD format.

25. The optical storage medium of claim 17, wherein the thickness of first metal reflector layer is greater than 5 nm and less than 25 nm.

26. The optical storage medium of claim 17, wherein the recording layer of the higher stack comprises grooves and lands with the grooves having a width of 320 nm, a distance between grooves of 740 nm and wherein a thickness of the recording layer of the higher stack is larger on the grooves than a thickness on the lands.

27. The optical storage medium of claim 26, wherein the thickness of the recording layer of the higher stack on the grooves is one of 60 nm, 80 nm, 100 nm, or 115 nm.

28. The optical storage medium of claim 26, wherein the thickness of the recording layer of the higher stack on the lands is one of 25 nm or 40 nm.

29. The optical storage medium of claim 17, wherein the optical thickness variation of the thickness periodically varies at defined intervals of the recording layer of the higher stack.

30. The optical storage medium of claim 17, wherein the variation of the thickness on groove of the recording layer of the higher stack is 0.073 λ.

31. A method of operating a multi-stack optical storage medium in a disk format with at least one stack receiving a radiation beam through another stack, comprising:

providing a semi-transparent substrate with an entrance face and pre-grooved face on the opposite side of the semi-transparent substrate from the entrance face;

providing a higher stack and a lower stack, separated by a spacer having a thickness within a range of 0.03 mm and 0.07 mm extending from the pre-grooved face of the semi-transparent substrate and including respective recording layers, the recording layer of the higher stack having a thickness on groove and a variation of thickness on groove between recorded and unrecorded areas equal to a first range of 0.06 λ to 0.08 λ; and receiving through the entrance face, the radiation beam having a wavelength (λ) less than or approximately equal to 655 nm and a wave front phase variation of within the first range for recording data on the recording layers, wherein data is recorded on the recording layer of the higher stack by the beam passing through the entrance face alone and on the recording layer of the lower stack by the beam passing through the entrance face and through the recording layer of the higher stack, wherein the recording layer of the higher stack comprises an organic dye material having: the thickness on groove greater than 28 nm and less than 115 nm.

* * * * *